US011546096B2

United States Patent
Lin et al.

(10) Patent No.: US 11,546,096 B2
(45) Date of Patent: Jan. 3, 2023

(54) METHOD AND SYSTEM FOR DATA TRANSFER IN A BLUETOOTH LOW ENERGY NETWORK

(71) Applicant: Carrier Corporation, Palm Beach Gardens, FL (US)

(72) Inventors: Chih-Kuang Lin, Dublin (IE); Davide Villa, Cork (IE); Adam Kuenzi, Silverton, OR (US); Michael Lang, Oregon City, OR (US); Ankit Tiwari, Natick, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 137 days.

(21) Appl. No.: 16/906,770

(22) Filed: Jun. 19, 2020

(65) Prior Publication Data

US 2020/0404473 A1 Dec. 24, 2020

(30) Foreign Application Priority Data

Jun. 21, 2019 (EP) .................................... 19181647
Jun. 21, 2019 (EP) .................................... 19181733

(51) Int. Cl.
*H04L 1/18* (2006.01)
*H04W 76/14* (2018.01)
(Continued)

(52) U.S. Cl.
CPC ............. *H04L 1/1854* (2013.01); *H04W 4/23* (2018.02); *H04W 4/80* (2018.02); *H04W 28/04* (2013.01);
(Continued)

(58) Field of Classification Search
CPC .. H04J 13/0044; H04J 13/004; H04B 17/318; H04W 4/23; H04W 4/80; H04W 28/04;
(Continued)

(56) References Cited

U.S. PATENT DOCUMENTS 7,436,790 B2 * 10/2008 Todd ................. H04W 52/0216
370/311
9,043,602 B1 * 5/2015 Krieger ................. H04L 63/123
713/181

(Continued)

FOREIGN PATENT DOCUMENTS

| CN | 105430605 A | 3/2016 |
| KR | 101917055 B1 | 11/2018 |

(Continued)

OTHER PUBLICATIONS

"Multihop Data Transfer Service for Bluetooth Low Energy"; Mikhaylov et al.; 2013 13th International Conference on ITS Telecommunications (ITST); Nov. 2013 (Year: 2013).*

(Continued)

*Primary Examiner* — Benjamin H Elliott, IV
(74) *Attorney, Agent, or Firm* — Cantor Colburn LLP

(57) ABSTRACT

A method for communicating data between Bluetooth Low Energy (BLE) devices in a network (100) including multiple nodes (200, 202). The method includes starting a scan mode at a first node (200) having data to send; and determining whether data to send has been transmitted to the first node from an upstream node or a downstream node. If the data to send was received from a downstream node, the first node begins a scan mode. If the data to send was received from an upstream node, the first node begins an ADV event.

12 Claims, 4 Drawing Sheets

(51) Int. Cl.
*H04W 76/40* (2018.01)
*H04W 28/04* (2009.01)
*H04W 4/23* (2018.01)
*H04W 4/80* (2018.01)
*H04W 74/08* (2009.01)
*H04J 13/00* (2011.01)
*H04W 8/26* (2009.01)
*H04W 64/00* (2009.01)
*H04B 17/318* (2015.01)
*H04W 84/20* (2009.01)
*H04W 84/18* (2009.01)

(52) U.S. Cl.
CPC ....... *H04W 74/0808* (2013.01); *H04W 76/14* (2018.02); *H04W 76/40* (2018.02); *H04B 17/318* (2015.01); *H04J 13/0044* (2013.01); *H04W 8/26* (2013.01); *H04W 64/00* (2013.01); *H04W 84/18* (2013.01); *H04W 84/20* (2013.01)

(58) Field of Classification Search
CPC . H04W 74/0808; H04W 76/14; H04W 76/40; H04W 8/26; H04W 64/00; H04W 84/18; H04W 84/20; H04W 4/06; H04L 1/1854; H04L 1/1851; H04L 2001/0093
See application file for complete search history.

(56) References Cited

U.S. PATENT DOCUMENTS

| | | | | |
|---|---|---|---|---|
| 9,179,412 B2* | 11/2015 | Kang | ................ | H04W 52/0261 |
| 9,191,772 B2* | 11/2015 | Xue | ................ | H04W 12/50 |
| 9,232,384 B2* | 1/2016 | Chen | ................ | H04W 4/80 |
| 9,258,695 B2* | 2/2016 | Kasslin | ................ | H04W 4/80 |
| 9,380,119 B2* | 6/2016 | Kasslin | ................ | H04W 52/0229 |
| 9,398,437 B2* | 7/2016 | Kasslin | ................ | H04L 67/16 |
| 9,408,060 B2* | 8/2016 | Helms | ................ | H04L 47/806 |
| 9,420,407 B2* | 8/2016 | Jakusovszky | ......... | H04W 48/10 |
| 9,445,222 B2* | 9/2016 | Salokannel | ............ | H04W 4/20 |
| 9,451,436 B2* | 9/2016 | Reunamaki | ........... | H04W 8/005 |
| 9,479,892 B2* | 10/2016 | Knaappila | ......... | H04W 52/0209 |
| 9,544,075 B2* | 1/2017 | Altman | ................ | H04W 12/02 |
| 9,544,713 B2* | 1/2017 | Chen | ................ | H04W 48/16 |
| 9,591,616 B2* | 3/2017 | Pang | ................ | H04W 72/005 |
| 9,591,693 B2* | 3/2017 | Stroud | ................ | H04B 5/0031 |
| 9,681,381 B2* | 6/2017 | Kang | ................ | H04W 52/0229 |
| 9,734,480 B2* | 8/2017 | Kerai | ................ | G06Q 10/0833 |
| 9,788,257 B2* | 10/2017 | Singh | ................ | H04W 4/80 |
| 9,794,934 B2* | 10/2017 | Zhang | ................ | H04W 8/005 |
| 9,801,059 B2* | 10/2017 | Ziv | ................ | H04W 12/03 |
| 9,866,389 B2* | 1/2018 | Reed | ................ | H04W 12/10 |
| 9,924,342 B2* | 3/2018 | Logue | ................ | H04L 12/2803 |
| 9,929,925 B2* | 3/2018 | Choi | ................ | H04W 4/80 |
| 9,949,204 B2* | 4/2018 | Palin | ................ | H04W 52/0225 |
| 9,980,207 B2* | 5/2018 | Di Marco | ......... | H04W 52/0216 |
| 10,013,826 B2* | 7/2018 | Ouellette | ................ | G07C 9/27 |
| 10,039,057 B1* | 7/2018 | Lam | ................ | H04W 4/02 |
| 2003/0227934 A1* | 12/2003 | White | ................ | H04L 45/16 370/432 |
| 2005/0058151 A1* | 3/2005 | Yeh | ................ | H04W 52/46 370/445 |
| 2007/0071025 A1* | 3/2007 | Bergstrom | ............ | H04L 1/1887 370/448 |
| 2012/0083210 A1* | 4/2012 | Cutrignelli | ............ | H04W 84/20 455/41.2 |
| 2012/0281570 A1* | 11/2012 | Jung | ................ | H04L 1/1854 370/252 |
| 2013/0182798 A1* | 7/2013 | Lozano | ................ | H04W 4/18 375/340 |
| 2013/0336111 A1* | 12/2013 | Vos | ................ | H04L 41/08 370/230 |
| 2014/0105009 A1* | 4/2014 | Vos | ................ | H04L 47/2475 370/230 |
| 2014/0355582 A1* | 12/2014 | Kamath | ................ | H05K 999/99 370/338 |
| 2015/0172391 A1* | 6/2015 | Kasslin | ............ | H04W 52/0229 370/338 |
| 2016/0353253 A1 | 12/2016 | Cherian et al. | | |
| 2017/0034647 A1* | 2/2017 | Takeuchi | ............ | H04W 8/005 |
| 2017/0034856 A1* | 2/2017 | Takeuchi | ............ | H04L 12/189 |
| 2017/0041868 A1* | 2/2017 | Palin | ................ | H04W 52/0203 |
| 2017/0303070 A1* | 10/2017 | Batra | ................ | H04W 76/14 |
| 2017/0317906 A1* | 11/2017 | Tsai | ................ | H04L 43/16 |
| 2017/0353365 A1* | 12/2017 | Li | ................ | H04B 1/713 |
| 2018/0041861 A1* | 2/2018 | Zhang | ................ | H04W 48/12 |
| 2018/0132183 A1* | 5/2018 | Gattu | ................ | G05B 15/02 |
| 2020/0053831 A1* | 2/2020 | Park | ................ | H04W 88/06 |
| 2020/0403736 A1* | 12/2020 | Lin | ................ | H04W 28/04 |
| 2020/0404473 A1* | 12/2020 | Lin | ................ | H04W 28/04 |

FOREIGN PATENT DOCUMENTS

| | | | | |
|---|---|---|---|---|
| WO | 2017160223 A1 | 9/2017 | | |
| WO | WO-2017160223 A1 * | 9/2017 | ........... | H04L 1/1657 |
| WO | 2018088952 A1 | 5/2018 | | |
| WO | WO-2018088952 A1 * | 5/2018 | ......... | H04L 61/2038 |

OTHER PUBLICATIONS

"On-demand updates after a node failure in a wireless network"; Villa et al.; 2020 31st Irish Signals and Systems Conference (ISSC); Jun. 2020 (Year: 2020).*
European Search Report for application EP 19181647.9, dated Dec. 12, 2019, 10 pages.
European Search Report for application EP 19181733.7, dated Nov. 14, 2019, 14 pages.

* cited by examiner

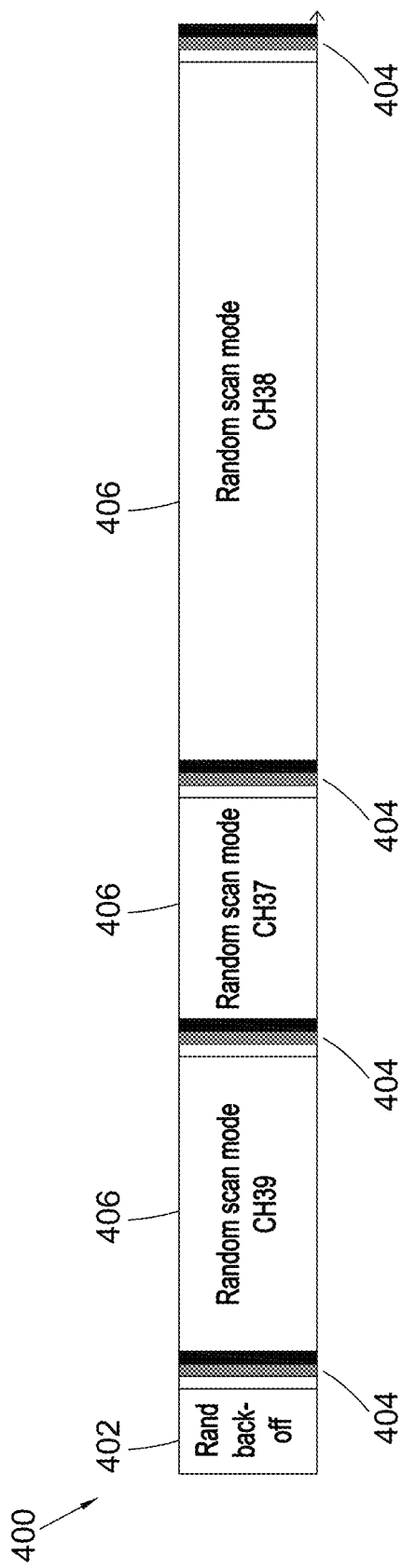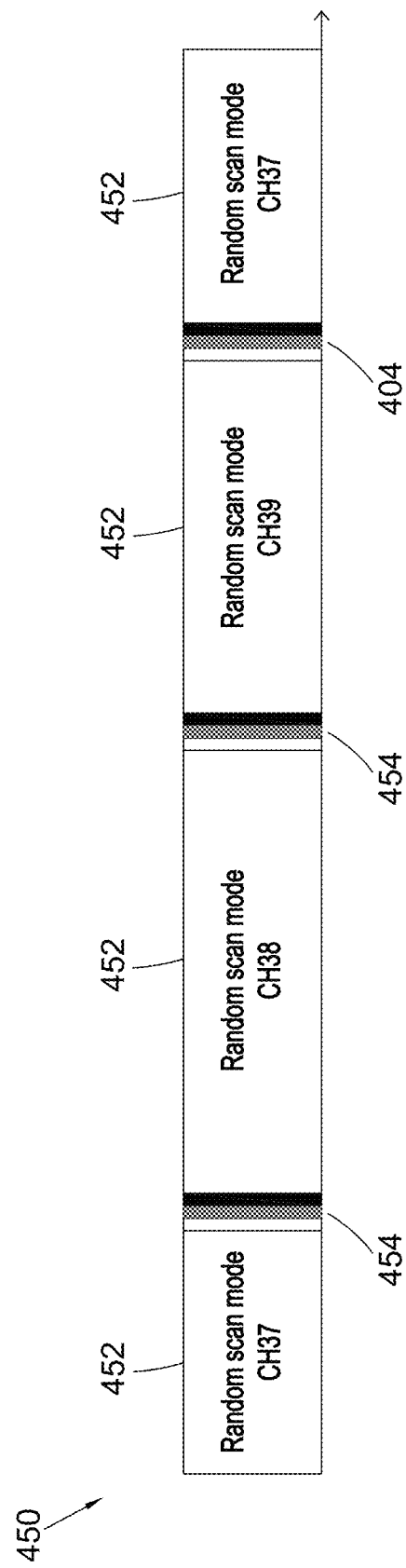

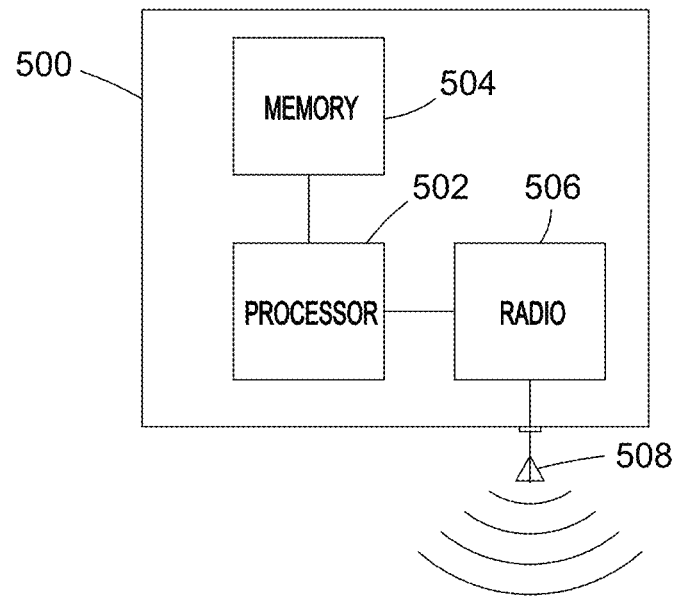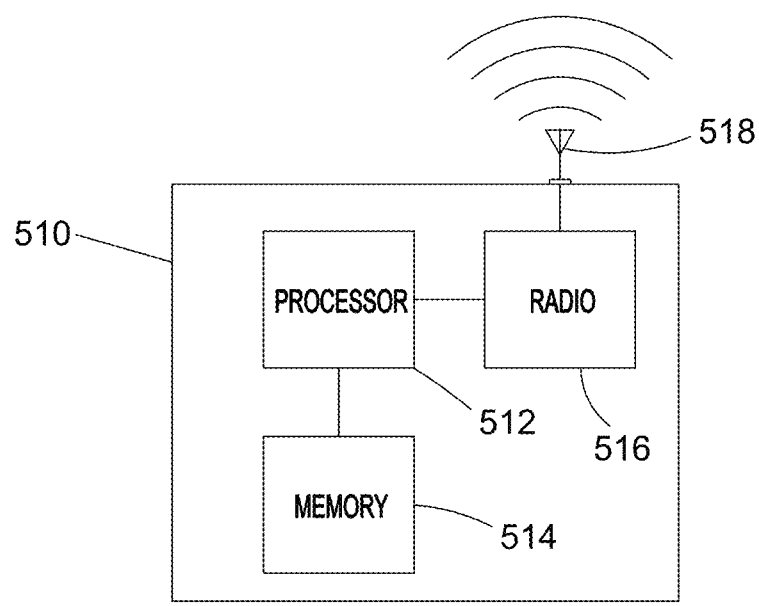
Fig. 5

METHOD AND SYSTEM FOR DATA TRANSFER IN A BLUETOOTH LOW ENERGY NETWORK

FOREIGN PRIORITY

This application claims priority to European Patent Application No. 19181647.9, filed Jun. 21, 2019 and European Application No. 19181733.7, filed Jun. 21, 2019, and all the benefits accruing therefrom under 35 U.S.C. § 119, the contents of which in its entirety are herein incorporated by reference.

BACKGROUND

The present disclosure relates to Bluetooth networks, particularly to methods of communication between Bluetooth devices in a Bluetooth low energy network.

The Bluetooth® Low Energy (BLE) specification is a set of standards for wireless network technologies operating within the 2.4-2.4835 GHz Industrial, Scientific and Medical (ISM) band. BLE is designed to considerably reduce power consumption compared to legacy, or "Classic", Bluetooth® devices.

Applications for the BLE specification include healthcare, security, fitness, and home entertainment. Within these applications, devices may utilise Bluetooth mesh profiles to communicate with other BLE devices in a network. Each device in the network can transfer data between other devices in the network, creating a so-called "mesh".

A number of previous applications have attempted to address various issues such as increasing the speed at which a connection between BLE devices is established and for avoiding data packet collision.

According to the specification, a BLE device operates across 40 channels in the 2.4 GHz band, each mapped onto a set of RF (radio frequency) channel index values 0, 1, ..., 39. Channels 0 to 36 are used for the transmission of data while channels 37, 38, and 39 are for the transmission of advertising (ADV) events.

The term "node" as used herein may refer to any device that may have BLE capability. Such devices may include smartphones, smart plugs, light bulbs, laptops, home entertainment devices or any other device that can connect to a BLE network. A node may also be able to communicate in other wireless networks, such as Wi-Fi® networks or cellular networks. A node may also be able to communicate via the Internet through such networks.

In the status quo, when a node does not have any data to send, it operates in a mode termed the "default mode". The default mode includes periodical ADV events and a low power state between the ADV events. Otherwise, if the node does have data to send, the node periodically sends periodic ADV events and inserts a scan mode between the ADV events. The scan mode is the mode in which the node is able to receive advertising packets from other nodes. The period of time over which this occurs is known as a scan window.

The ADV event comprises transmitting an ADV packet on one of the ADV channels. A first node may advertise sequentially on some or all of the three ADV channels. Similarly, if the first node is in the scan mode, the scan may occur sequentially on some or all of the three ADV channels.

If a second node is in the scan mode and detects an ADV packet sent by the first node, the second node may communicate with the first node and a data session between the first and second nodes may be established. Once the data session has been established, data can then be transferred between the first and second nodes.

These rules enable a fast data session setup for data exchanges while minimizing a node's energy consumption.

In this standard regime, there is a significant chance of ADV packet collision between two nodes, leading to a failed data session setup. This is because ADV events are limited to three transmission channels. This problem can be exacerbated if the ADV interval (the time between ADV events) is short or if multiple nodes have synchronised ADV cycles. In both of these cases, the chance for ADV packet collision and, therefore, data session setup failure, is increased. To minimise this problem, the BLE specification includes a random delay of up to 10 ms before an ADV event to randomize the ADV's start time and reduce the likelihood of ADV packet collision. Such a method however is inefficient for the short ADV interval and synchronous ADV cycles cases.

SUMMARY

Viewed from a first aspect, the present invention provides a method for communicating data between Bluetooth Low Energy (BLE) devices in a network comprising multiple nodes, the method comprising: starting a scan mode at a first node having data to send; and determining whether data to send has been transmitted to the first node from an upstream node or a downstream node, wherein: (i) if the data to send was received from a downstream node, the first node begins a scan mode; or (ii) if the data to send was received from an upstream node, the first node begins an ADV event.

Viewed from a second aspect, the invention provides a Bluetooth Low Energy network comprising multiple nodes and being an apparatus for communicating data between Bluetooth Low Energy (BLE) devices, the apparatus network comprising: a first BLE device configured to enter a scan mode when having data to send; and a second BLE device; wherein the first device is configured to determine whether the data to send has been transmitted to the first node from an upstream node or a downstream node, and is further configured such that: (i) if the data to send was received from a downstream node, the first node begins a scan mode; or (ii) if the data to send was received from an upstream node, the first node begins an ADV event.

Viewed from a third aspect the invention provides a computer program product containing instructions that, when executed within a Bluetooth Low Energy network comprising multiple nodes, will configure the network to operate in accordance with the method of the first aspect.

The following describes optional features that may be combined with the method of the first aspect, the network of the second aspect or the computer program product of the third aspect.

The BLE devices may include any device that has the ability to communicate with other devices using Bluetooth low energy transmissions. Such devices may include smartphones, smart plugs, light bulbs, laptops, and home entertainment devices. BLE devices may be members of a BLE network. The BLE network may comprise a head node or gateway, where the head node is able to perform protocol conversions communicate data from the BLE network to another network that the head node is connected to. Other networks may include cellular networks, the Internet, a local intranet, and cloud networks.

In the BLE network, the BLE devices that are members of the network may be called nodes. The network may comprise any number of nodes and may be distributed so that the head node is connected to at least one node. Each node in the network may be connected directly to the head node or is connected to the head node via at least one other node. In this way, the head node is able to communicate with all nodes in a BLE network, and vice versa.

All nodes in the network may be considered to be downstream with respect to the head node and, conversely, the head node may be considered upstream of other nodes in the network. The structure of the network may be that data can travel from the head node and through other intermediary nodes before reaching a destination node. In this way, intermediary nodes may be upstream of some nodes and may be downstream of other nodes. A node that is at the edge of a network may be called an end node. Data that is transmitted from the head node to an intermediary node or end node may be considered to be travelling downstream. Data that is transmitted from an end node or intermediary node in the direction of the head node may be considered to be travelling upstream.

The BLE network may be configured to allow BLE devices to join and leave networks on the fly. The skilled person would readily understand that BLE networks may be configured to be restructured to account for new devices joining the network or current devices leaving the network. The skilled person would also readily understand that a BLE network may be configured to restructure itself to account for changes in the physical location of BLE devices in the network and/or optimise the network for efficient data transfer between devices.

The distance any particular node is away from the head node may be defined by the number of nodes data must travel through to reach that particular node. For example, a node that directly communicates with the head node may be considered one "hop" away from the head node. Likewise, a first node that communicates with the head node via a second node may be considered to be two "hops" away from the head node. In this latter case, the second node may be considered to be downstream of the head node and also upstream of the first node. In this way, it is possible to define how many hops any particular node is away from the head node. The number of hops has no bearing on the physical distance between nodes.

The hop distance for a particular node may change due to a reconfiguration of the network. Such a reconfiguration may occur for any number of reasons including, but not limited to: optimisation of the network; in response to the number of nodes in the network changing; and the physical movement of nodes in the network.

The hop distance for a particular node may be stored in the memory of said node as identifying data for that node. Other identifying data may include a node ID (identification) number or a MAC (media access control) address for the node. The node may store identifying data for other nodes in the network, such as neighbouring nodes.

When a node in the BLE network does not have data to send, it may maintain contact with the network by being in a default mode. The default mode may comprise the periodic emission of advertisement (ADV) events and being in a low power state between the ADV events. Periodic ADV interval range is between 20 ms and 10240 ms according to Bluetooth specification 4.0. Shorter the ADV interval is, more frequent the node wakes up and transmits the ADV packets (higher energy consumptions).

A scan mode comprises a period of time in which a BLE device may receive data from an advertising BLE device. The channel on which the BLE device is scanning may be any one of the three ADV channels discussed above. The scan mode may sequentially cycle through each of the ADV channels. The period of time that the BLE device is scanning for an ADV channel is known as the "scan window". The period of time between scanning events is known as the "scan interval". The scan window may last for any length of duration up to a maximum length of time equal to the scan interval. According to Bluetooth specification 4.0, the scan window and scan interval range is between 2.5 ms and 10240 ms. The scan window may have a random duration within a time period. This time period determines the maximum time of scanning an ADV channel. The shorter this time period is, the faster the node scans all of the ADV channels and leads to a quick target discovery. The scan window may have a random duration that is less than or equal to the scan interval.

An advertisement (ADV) event comprises the transmission of an ADV signal by a first BLE device. The purpose of this signal may be to advertise that the first BLE device is available to establish a wireless connection. The ADV signal may be detected by a second BLE device that is in scan mode and a data session may then be established between the two devises and data may be exchanged between them.

As discussed above, a BLE device may advertise on up to three advertising channels. An ADV event may comprise a BLE device transmitting an ADV signal on one, two or all three of the three available channels.

When a node in the BLE network does have data to send, then it may execute the method of the present invention to establish a data session with another node in order to send said data.

An advantage of the present method is the reduction in the risk of ADV events or scan events being synchronous between two nodes. This reduces the likelihood of ADV or connect request packets colliding, and so reduces the risk of failure of the setup of a data session. Another advantage of this method is, by reducing the mean time for data sessions to be set up, nodes may return to their default state more quickly and so each node may save more power and battery life may be extended.

Before determining whether the data to send from the first node was received from an upstream node or a downstream node, the first node having data to send may start the scan mode. If the first node fails to receive an ADV packet from the second node within a predetermined amount of time, the first node may proceed with the step of determining whether the data to send from the first node was received from an upstream node or a downstream node.

In the case where the data to send is determined to have been received from an upstream node relative to the first node, and before the first node begins the ADV event, the first node may include a random time delay within a time period which is at least twice of an ADV event. This delay potentially creates a temporal transmission separation between two or more nodes with pending downstream data delivery. After the random time delay, the first node may begin an ADV event. If a data session is not successfully established after the ADV event, the first node may start a scan mode with the random scan window. If a data session is not established after the scan mode, the first mode may start a second ADV event. This cycle may be repeated until a data session is established. When a data session is successfully established between the first and second nodes, data may be transmitted between them.

In the case where the data to send is determined to have been received from a downstream node relative to the first node, and a data session is not established after the scan mode with the random scan window, the first mode may start an ADV event. If a data session is not established after the ADV event, then the first node starts a second scan mode. This cycle may be repeated until a data session is successfully established.

DRAWING DESCRIPTION

Certain embodiments of the invention will now be described by way of example only and with reference to the accompanying drawings in which:

FIGS. 4A and 4B show timelines for the cycle of ADV events and scan events that occur at a node attempting to set up a data session in accordance with the method of FIG. 3.

FIG. 5 shows a schematic view of a pair of BLE devices.

DETAILED DESCRIPTION

A node in a BLE network will be in a default mode if it does not have any data to send. The default mode involves emitting periodical advertisement (ADV) events and being in a low power state between the ADV events. If the node does have data to send, it will attempt to establish a data session with a second node by using any of the standard methods for doing so.

In the present disclosure, if a first node is not able to establish a data session with a second node using standard means within a time limit, the first node checks whether it is upstream or downstream of the second node. Depending on whether the first node is upstream or downstream of the second node, the first node takes one of two possible actions. The first node is able to determine its position in the data stream compared to the second node by comparing the hop distance of the first node to the hop distance of the second node. If the hop distance of the first node is greater than the hop distance of the second node, then the first node is downstream of the second node. If the hop distance of the first node is less than the hop distance of the second node, then the first node is upstream of the second node. Regarding the time limit that determines the data session establishment failure, this limit should include sufficient time for the first node to establish a connection within multiple ADV intervals (successfully hear the ADV packet of the second node). If there were no success after the multiple ADV intervals, the first node will adopt the proposed method in this disclosure. For example, this time threshold may be configured to be a duration equal to five ADV intervals.

Figure 1:
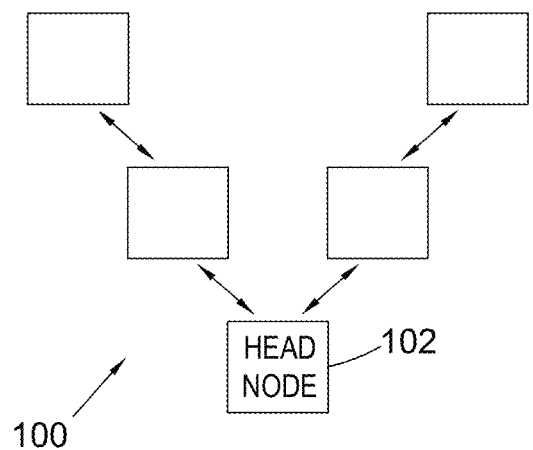
FIG. 1 shows an exemplary BLE network.

FIG. 1 shows an example BLE network 100 where the network 100 is depicted as a tree. A head node 102 forms the "root" of the network 100 and devices in the BLE network form "branches" in the network. Some BLE devices are not directly connected to the head node 102; instead they are connected via a branch node. This means that any transmissions sent from the head node 102 may have to be communicated through another BLE node before the transmission reaches its destination node.

Figure 2:
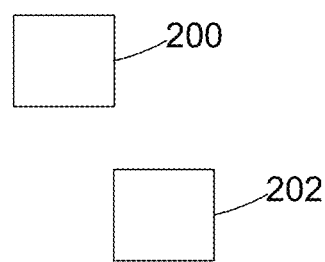
FIG. 2 shows a pair of BLE devices.

FIG. 2 shows a first node 200 and a second node 202. The first node 200 and the second node 202 may be any two adjacent nodes in a BLE network 100. Here, the term "adjacent" means that the first node 200 and second node 202 are configured to communicate with one another directly, rather than through an intermediate node. Each node may be able to determine its position in a BLE network 100 relative to other nodes by storing identifying information about its neighbours. Neighbouring nodes may be defined as those that are immediately connected to a node in the network 100. Identifying information may include hop distance and a unique node ID.

When data has been transmitted to a first node 200 the first node 200 then passes on that data to the next node in the network, where the next node in the network is the second node 202. If the data was received at the first node 200 from a downstream node, the first node 200 begins a scan mode. (Please note that the last sentence only happens when the first node fails to setup a connection with the second node after the predefined timer.) The scan mode may comprise scanning in one of the three ADV channels or scanning sequentially through more than one of the ADV channels.

If there is no successful reception of an ADV packet from the second node 200, and after the scan window, an ADV event occurs at the first node 200. Then, if the ADV event does not lead to the creation of a data session with the second node 202, the first node 200 returns to the scan mode. The first node 200 will cycle between scan mode and ADV mode until a data session is established.

If, instead, the data to send was received at the first node 200 from an upstream node the first node 200 begins with a random delay and an ADV event. (Please note that the last sentence only happens when the first node fails to setup a connection with the second node after the predefined timer.) If the second node 202 does not successfully receive the ADV packet, the first node 200 enters the scan mode. Then, as in the case above, the first node 200 will cycle between scan mode and ADV mode until a data session is established.

When the first node 200 successfully completes the scan mode or an ADV event, a data session will be established with the second node 202. The data session will facilitate the transfer of data from the first node 200 to the second node 202. Once the first node 200 has sent the data, the first node 200 returns to the default mode.

Figure 3:
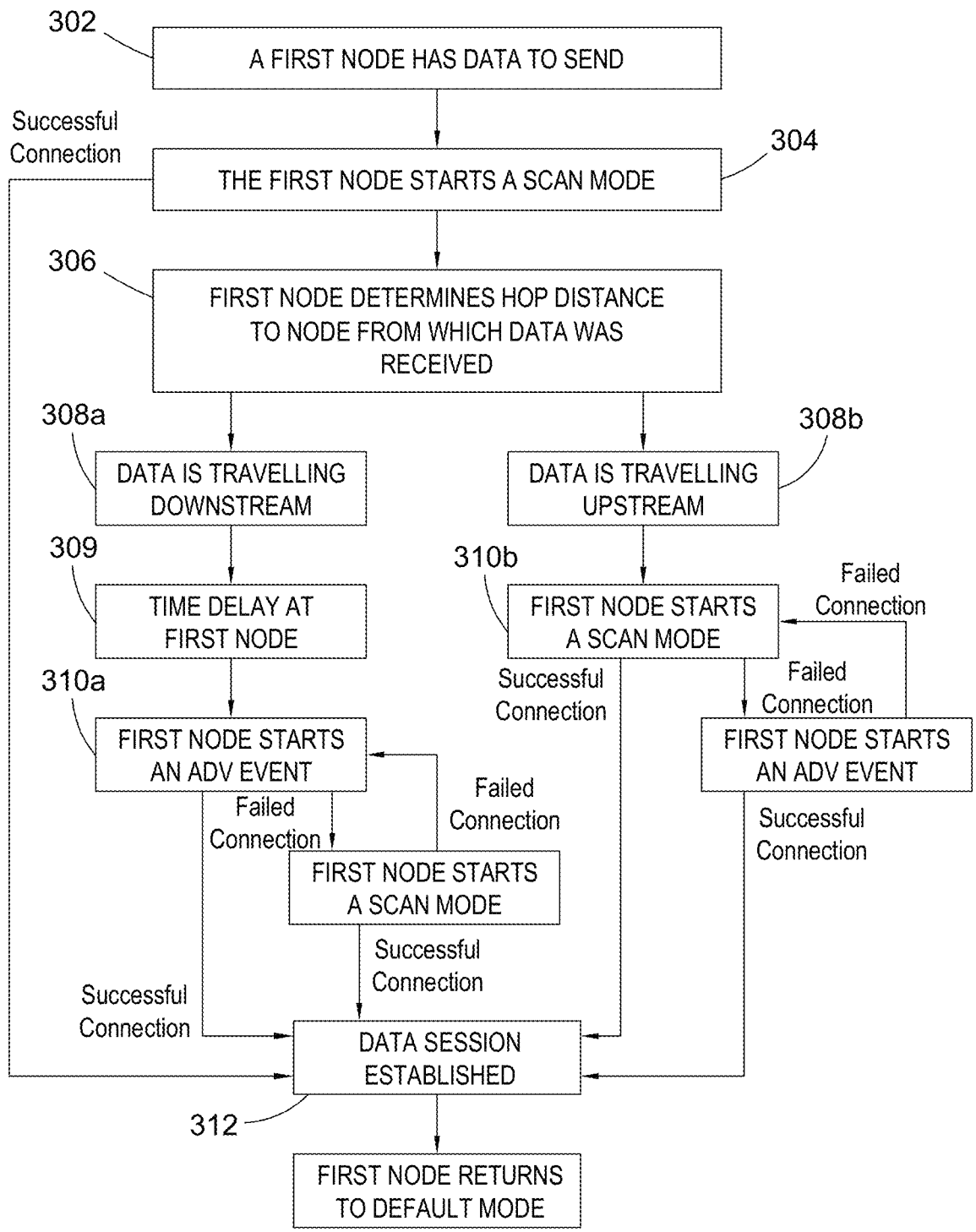
FIG. 3 is a flowchart illustrating a method for establishing a data session between two nodes in a BLE network.

FIG. 3 is a flowchart showing the method for establishing a data session between two nodes in a BLE network. At step 302, a first node has data to send. At step 304, the first node starts a scan mode. If the first node receives an ADV packet from the second node within a predetermined amount of time, then a data session is established with the second node and data can be transferred, as shown in step 312.

If an ADV packet is not received within the predetermined amount of time, then, at step 306, the first node determines its hop distance relative to a third node from which the data was received. If the hop distance of the first node is greater than the hop distance of the third node, then the data is determined to be travelling downstream, as shown at step 308a. Therefore, the first node is upstream of the second node. A random time delay having a length of at least twice of an ADV event occurs at step 309. This delay potentially creates a temporal transmission separation between two or more nodes with pending downstream data delivery. At step 310a, the first node performs an ADV event. If the ADV packet is not successfully received by the second node, the first node switches to scan mode and then cycles through scan modes and ADV events until a data session is established at step 312.

If the hop distance of the first node is smaller than the hop distance of the third node, then, as shown at step 308b, the data is determined to be travelling upstream. Therefore, first node is downstream of the second node. At step 310b, the first node begins a scan mode. The scan mode may comprise scanning in one of the three ADV channels or scanning sequentially through more than one of the ADV channels. If the first node does not receive an ADV packet in the scan mode, it switches to an ADV event and then cycles through scan modes and ADV events until a data session is established at step 312. Once data transmission has been completed, the first node returns to the default mode.

FIGS. 4A and 4B show timelines 400, 450 that assume no successful ADV packet reception for downstream and upstream data deliveries. These timelines illustrate the cycle of ADV events and scan events that occur at a node attempting to set up a data session in accordance with the method of FIG. 3.

FIG. 4A depicts the timeline 400 of a first node having data to send, where the data to send is from an upstream node and is travelling downstream, and so the first node is upstream from a second node. There is a delay 402, or "random back-off", within a time period which is at least twice of an ADV event. This delay 402 potentially creates a temporal transmission separation between two or more nodes with pending downstream data delivery Immediately after the delay 402, an ADV event 404 occurs which involves emitting an ADV packet on all three ADV channels. After the ADV event 404, a scan mode 406 of random duration occurs. The node then cycles between ADV events 404 and scan modes 406 of random durations. Each successive scan mode 406 switches to the next ADV channel so that the scan modes scan sequentially through the three ADV channels.

FIG. 4B depicts the timeline 450 of the first node having data to send, where the data to send is from a downstream node and is travelling upstream, and so the first node is downstream from a second node. After determining that it is upstream relative to the second node, the first node starts with a scan mode 452 of random length. Immediately after the scan mode 452, an ADV event 454 occurs which emits an ADV packet across all three ADV channels. Then another scan mode 452 of random duration begins immediately after the ADV event 454. Then, as before, the node cycles between ADV events 454 and scan modes 452 of random durations.

FIG. 5 illustrates a pair of BLE devices 500, 510 which may utilise the methods discussed above. The BLE devices 500, 510 might be any suitable known type of device, and they are modified compared to the known devices to operate in accordance with a method as set out above. A first BLE device 500 comprises a processor 502, a memory unit 504, a radio 506, and an antenna 508. Computer program products for performing the methods described herein may be stored as an application in the memory unit 504. The memory unit 504 can be a hard drive, solid state or optical memory source. The processor 502 is configured to access and execute software, applications, and data stored on the memory unit 504.

The radio 506 is configured to receive and transmit BLE signals via the antenna 508. The processor 502 is configured to interface with the radio 506 and the application may be configured to control the radio 506 and antenna 508 when executed on the processor 502.

A second BLE device 510 includes similar hardware an operations to the first BLE device 500. The antenna 508 of the first BLE device 500 is configured to communicate with the antenna 518 of the second BLE device 510.

What is claimed is:

1. A method for communicating data between Bluetooth Low Energy (BLE) devices in a network comprising multiple nodes, the method comprising:
   starting a first scan mode at a first node when having data to send; and,
   after starting the first scan mode, determining whether the data had been received at the first node from an upstream node or a downstream node, wherein:
      (i) if the data was received from a downstream node, the first node begins a second scan mode; and
      (ii) if the data was received from an upstream node, the first node begins an advertising (ADV) event.

2. The method of claim 1, wherein, if the data was received from an upstream node, the first node waits for a time delay before beginning an ADV event.

3. The method of claim 2, wherein the time delay is a time period which is at least twice that of an ADV event.

4. The method of any of claim 1, wherein, if the data was received from an upstream node, and after the ADV event occurs, the first node begins a scan mode of random duration.

5. The method of claim 4, wherein, if the data was received from an upstream node, and after the first scan mode occurs, the first node cycles between ADV events and scan modes, wherein the scan modes are of random durations.

6. The method of any of claim 1, wherein, if the data was received from a downstream node, and after the second scan mode occurs, the first node begins an ADV event.

7. The method of claim 6, wherein, if the data was received from a downstream node, and after the ADV event occurs, the first node cycles between scan modes of random durations and ADV events.

8. The method of claim 1, wherein a data session is established and the data is transmitted from the first node to a second node.

9. The method of claim 8, wherein after the data is transmitted from the first node to the second node, the first node returns to a default mode.

10. A Bluetooth Low Energy (BLE) network comprising multiple nodes and being for communicating data between Bluetooth Low Energy devices, the network comprising:
   a first BLE device configured to enter a first scan mode when having data to send; and
   a second BLE device;
   wherein the first BLE device is configured to determine, after starting the first scan mode, whether the data had been received at the first BLE device from an upstream node or a downstream node, and is further configured such that:
      (i) if the data was received from a downstream node, the first BLE device begins a second scan mode; and
      (ii) if the data was received from an upstream node, the first BLE device begins an advertising (ADV) event.

11. A Bluetooth Low Energy (BLE) network comprising multiple nodes and being for communicating data between Bluetooth Low Energy devices, wherein the network is configured to operate in accordance with the method of claim 1.

12. A computer program product containing instructions stored on a non-transitory computer readable medium that, when executed within a Bluetooth Low Energy (BLE) network comprising multiple nodes, will configure the BLE network to operate in accordance with the method of claim 1.

* * * * *